United States Patent
Cramer et al.

(10) Patent No.: US 11,636,235 B2
(45) Date of Patent: Apr. 25, 2023

(54) SYSTEMS AND METHODS OF PREDICTING ARCHITECTURAL MATERIALS WITHIN A SPACE

(71) Applicant: ARMSTRONG WORLD INDUSTRIES, INC., Lancaster, PA (US)

(72) Inventors: Matthew S. Cramer, Lancaster, PA (US); Sean D. Browne, Lancaster, PA (US); William H. Frantz, Elizabethtown, PA (US); Steven P. Wilkinson, Lincoln University, PA (US); Jeffrey D. Fulmer, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 285 days.

(21) Appl. No.: 16/848,519

(22) Filed: Apr. 14, 2020

(65) Prior Publication Data

US 2020/0327262 A1     Oct. 15, 2020

Related U.S. Application Data

(60) Provisional application No. 62/834,223, filed on Apr. 15, 2019.

(51) Int. Cl.
*G06F 30/13*     (2020.01)
*G06F 30/12*     (2020.01)
(Continued)

(52) U.S. Cl.
CPC ............ *G06F 30/13* (2020.01); *G06F 3/0482* (2013.01); *G06F 3/04815* (2013.01);
(Continued)

(58) Field of Classification Search
CPC .... G06F 30/13; G06F 3/04815; G06F 3/0482; G06F 3/04845; G06F 30/12; G06F 2111/20
See application file for complete search history.

(56) References Cited

U.S. PATENT DOCUMENTS 7,860,301 B2   12/2010   Se et al.
7,966,159 B2   6/2011    Lambert
(Continued)

FOREIGN PATENT DOCUMENTS

CN       106485785 A       3/2017
KR    10-2013-0026553 A    3/2013
(Continued)

OTHER PUBLICATIONS

International Search Report for Corresponding PCT/US2020/028137 dated Jul. 27, 2020.

*Primary Examiner* — Michael Roswell
(74) *Attorney, Agent, or Firm* — Craig M. Sterner

(57) ABSTRACT

A system, apparatus, and/or method is disclosed for designing a real-world space. For example, image data for an image of the space may be received. The image data may comprise a surface that is modifiable via an architectural material. Measuring rules for determining estimated real-world dimensions of the surface of the space may be executed. The measuring rules may be based on the received image data of the space. The estimated dimensions may comprise a length, width, and/or height of the surface of the space. A type and/or quantity of the architectural material for modifying the surface of the space may be determined based on the estimated dimensions of the surface of the space. A modified image of the space may be displayed in which the surface of the space is modified with the architectural
(Continued)

material. The determined type and/or quantity of the architectural material may be displayed.

16 Claims, 11 Drawing Sheets

(51) Int. Cl.
 *G06F 3/04815* (2022.01)
 *G06F 3/04845* (2022.01)
 *G06F 3/0482* (2013.01)
 *G06F 111/20* (2020.01)
(52) U.S. Cl.
 CPC .......... *G06F 3/04845* (2013.01); *G06F 30/12* (2020.01); *G06F 2111/20* (2020.01)

(56) References Cited

U.S. PATENT DOCUMENTS

| | | | |
|---|---|---|---|
| 8,502,795 B2 | 8/2013 | Wilson et al. | |
| 8,885,916 B1 | 11/2014 | Maurer et al. | |
| 8,923,650 B2 | 12/2014 | Wexler | |
| 8,977,520 B2 | 3/2015 | Stephens et al. | |
| 9,602,589 B1 | 3/2017 | Jackson et al. | |
| 9,805,451 B2 | 10/2017 | Sun et al. | |
| 11,263,739 B2* | 3/2022 | Yonaha | G06T 7/0004 |
| 2004/0233461 A1 | 11/2004 | Armstrong et al. | |
| 2013/0155109 A1 | 6/2013 | Schultz et al. | |
| 2014/0075361 A1* | 3/2014 | Reynolds | G06T 11/001 715/771 |
| 2014/0278697 A1* | 9/2014 | Thornberry | G06Q 50/08 705/7.23 |
| 2016/0004795 A1 | 1/2016 | Novak | |
| 2016/0363990 A1* | 12/2016 | Key | G01G 19/52 |
| 2018/0182163 A1 | 6/2018 | Tung et al. | |
| 2018/0197557 A1* | 7/2018 | Guo | G10L 15/02 |
| 2018/0360393 A1* | 12/2018 | Van Berkel-Wijnen | G01G 19/50 |
| 2019/0080200 A1* | 3/2019 | Mishra | G06K 9/6256 |
| 2020/0258285 A1* | 8/2020 | Dempsey | G06T 15/20 |

FOREIGN PATENT DOCUMENTS

KR 10-1465487 B1 11/2014
WO WO 2017/211726 A1 12/2017

* cited by examiner

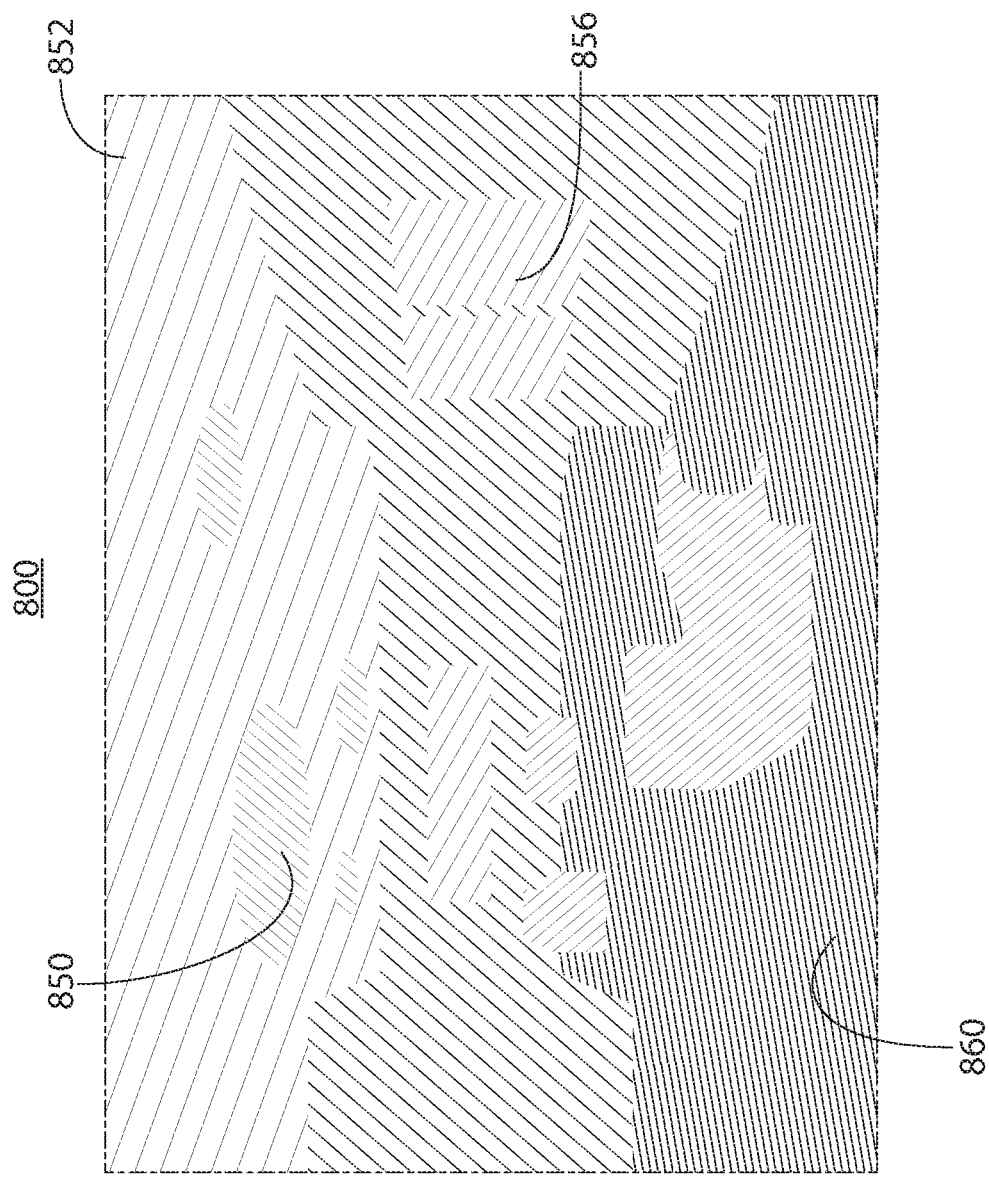
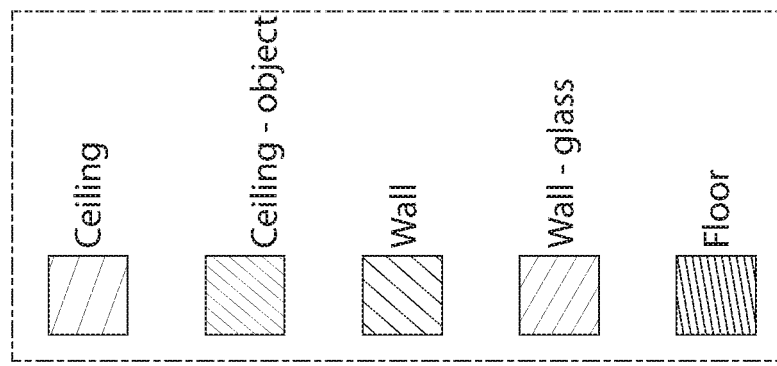
FIG. 8B
FIG. 8A

SYSTEMS AND METHODS OF PREDICTING ARCHITECTURAL MATERIALS WITHIN A SPACE

CROSS-REFERENCE TO RELATED APPLICATIONS

This application claims the benefit of U.S. Provisional Application No. 62/834,223, filed on Apr. 15, 2019. The disclosure of the above application is incorporated herein by reference.

BACKGROUND

An owner of a space (e.g., a room) may desire to improve the look of the space with architectural materials, such as by adding new architectural materials to a floor, wall, ceiling, etc. Designing, or redesigning, a space in such a manner often involves taking physical measurements of the space and selecting materials from many available options. For example, when designing a space, the owner is faced with deciding on the on type of architectural material to use for the space, the color of the architectural material to be used, and the placement of the architectural material. Such decisions may be impacted by the dimensions of the space and/or budgetary reasons. Although the owner may be aware of her budget, she may not initially be aware of dimensions of the space and the cost of the design.

When beginning the design or redesign of the space, the owner is often left overwhelmed by the choices available, which may result in the owner being unable to decide on the design or redesign. Alternatively, upon completion of the design or redesign the owner may realize that the chosen architectural materials is undesired. This may leave the owner displeased, due to the cost and time often required for a design or redesign. Accordingly, improved systems and methods are desired for automatically measuring the dimensions of a room, as well as for choosing the type, color, and placement of architectural materials for the design or redesign. Further, improved systems and methods for calculating architectural materials quantity and/or a cost is desired. Such systems and methods, as well as others, are described herein.

SUMMARY

A system, apparatus, and/or method is disclosed for designing a space (e.g., a space in the real-world, such as a room). For example, image data for an image of the space may be received. The image data may comprise a surface that is modifiable via one or more architectural materials (e.g., a coverable element), a surface that is not modifiable via one or more of the architectural materials (e.g., a non-coverable element), and/or an element that may conceal a coverable element and/or a non-coverable element. Measuring rules for determining estimated dimensions (e.g., real-world dimensions) of the surface of the space may be executed. The measuring rules may be based on the received image data of the space. The estimated dimensions may comprise a length, width, and/or height of the surface of the space. A type and/or quantity of the architectural material for modifying the surface of the space may be determined based on the estimated dimensions of the surface of the space. A modified image of the space may be displayed in which the surface of the space is modified with the architectural material. The determined type and/or quantity of the architectural material may be displayed.

In an aspect, prior image data of other spaces may be received that comprises other surfaces modifiable via architectural materials. Actual dimensions of the surfaces may be received. The measuring rules of the surface may be generated, for example, by modifying initial measurement rules based on estimated dimensions of the surfaces and the actual dimensions of the surfaces.

In an aspect, the initial measuring rules may be generated based on a relationship between the estimated dimensions and the actual dimensions of the surfaces. The initial measuring rules may be generated based on a difference between the prior estimated dimensions and the actual dimensions of the surfaces.

In an aspect, prior image data of other spaces may be received, for example, which comprises other surfaces modifiable via architectural materials. Initial measuring rules for determining estimated dimensions of the surfaces may be executed based on the prior image data. Actual dimensions of the surfaces may be received. The measuring rules may be generated by modifying the initial measurement rules based on the estimated dimensions of the surfaces and the actual dimensions of the surfaces.

In an aspect, the received image data of the space may be derived from a two-dimensional image, a three-dimension image, etc. In an aspect, the estimated dimensions of the surface of the space may be based on a reference object being placed in the space. The reference object may have a known size and/or may provide a spatial perspective to the image data. In an aspect, the estimated dimensions of the surface of the space may be based on a user's annotation of the space.

In an aspect, an estimated reverberation time within the space may be determined, for example, based on the estimated dimensions of the surface of the space. An actual reverberation time within the space may be determined. Actual dimensions of the surface of the space may be determined based on the estimated reverberation time and the actual reverberation time.

In an aspect, the architectural material may be a flooring material. The type of the architectural material may be based on a selected type selected by a user In an aspect, a pixel-to-length ratio of pixels disposed within the image data of the space may be determined. The estimated dimensions of the surface of the space may be determined based on the pixel-to-length ratio.

In an aspect, a calculated cost of the type and the quantity of the architectural material may be determined. The calculated cost may be displayed. In an aspect, a modified image of the space may comprise the determined type and/or quantity of the architectural material being presented upon the surface of the space.

In an aspect, differentiation rules for differentiating elements of the space may be executed. The elements may comprise a floor, wall, and/or ceiling of the space.

BRIEF DESCRIPTION OF THE DRAWINGS

The present invention will become more fully understood from the detailed description and the accompanying drawings, wherein:

FIGS. 8A, 8B are example annotations of the room as shown on FIG. 7;

DETAILED DESCRIPTION

Figure 1:
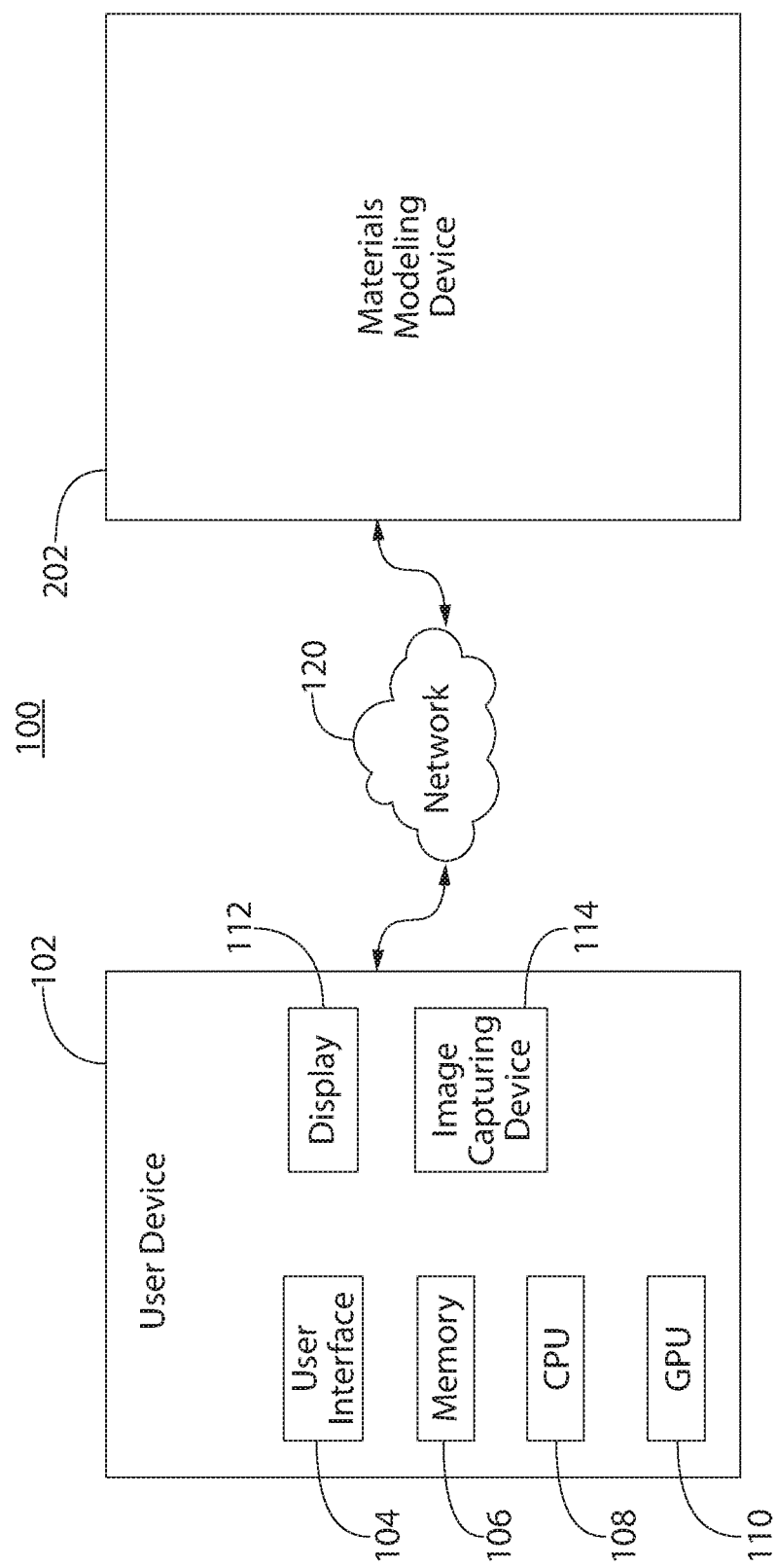
FIG. 1 is a block diagram of an example system including a user device.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present invention may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present invention may be embodied in the form of computer-implemented processes and apparatuses such as processor-based data processing and communication systems or computer systems for practicing those processes. The present invention may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

FIG. 1 is a block diagram of an example system 100 for calculating the dimensions of a space and/or for receiving information relating to predicted architectural materials of a space. The space may be a space in the real-world, such as a real-world room (e.g., basement, family room, conference room, classroom, etc.). The dimensions may be dimensions in the real-world, such as dimensions of a space in the real-world. The dimensions may be an area, a volume, a distance, etc. The dimensions may be in feet, inches, meters, centimeters, etc.

System 100 includes a user device 102 configured to connect to a materials modelling device 202 (further described in FIG. 2) via a network 120. Network 120 may include wired and/or wireless communication networks. For example, networks 120 may include a local area network (LAN), a metropolitan area network (MAN), and/or a wide area network (WAN). Network 120 may facilitate a connection to the Internet. To provide further examples, network 120 may include wired telephone and cable hardware, satellite, cellular phone communication networks, etc.

User device 102 may include a user interface 104, a memory 106, a central processing unit (CPU) 108, a graphics processing unit (GPU) 110, an image capturing device 114, and/or a display 112. User device 102 may be implemented as a user equipment (UE) such as a mobile device, a computer, laptop, tablet, desktop, or any other suitable type of computing device.

User interface 104 may allow a user to interact with user device 102. For example, user interface 104 may include a user-input device such as an interactive portion of display 112 (e.g., a "soft" keyboard displayed on display 112), an external hardware keyboard configured to communicate with user device 104 via a wired or a wireless connection (e.g., a Bluetooth keyboard), an external mouse, or any other user-input device.

Memory 106 may store instructions executable on the CPU 108 and/or the GPU 110. The instructions may include machine readable instructions that, when executed by CPU 108 and/or GPU 110, cause the CPU 108 and/or GPU 110 to perform various acts. Memory 106 may store instructions that when executed by CPU 108 and/or GPU 110 cause CPU 108 and/or GPU 110 to enable user interface 104 to interact with a user. For example, executable instructions may enable user interface to display (via Display 112) one or more prompts to a user, and/or accept user input. Instructions stored in memory 106 may enable a user to select a length measurement within an image. For example, a user may utilize user interface 104 to specify a length selection by selecting two points within the image that denote a desired measurement length. In other examples, a user may utilize user interface 104 to click, hold, or drag a cursor to define a desired measurement length.

CPU 108 and/or GPU 110 may be configured to communicate with memory 106 to store to and read data from memory 106. For example, memory 106 may be a computer-readable non-transitory storage device that may include any combination of volatile (e.g., random access memory (RAM)) or non-volatile (e.g., battery-backed RAM, FLASH, etc.) memory.

Image capturing device 114 may be configured to capture an image. The image may be a two-dimensional image, a three-dimensional image, etc. Image capturing device 114 may be configured to capture an image in a digital format having a number of pixels. Although image capturing device 114 is illustrated in FIG. 1 as internal to user device 102, in other examples image capturing device 114 may be internal and/or external to user device 102. In an example, image capturing device 114 may be implemented as a camera coupled to user device 102. Image capturing device 114 may be implemented as a webcam coupled to user device 102 and configured to communicate with user device 102. Image capturing device 114 may be implemented as a digital camera configured to transfer digital images to user device 102 and/or to materials modelling device 202. Such transfers may occur via a cable, a wireless transmission, network 120/220, and/or a physical memory card device transfer (e.g., SD Card, Flash card, etc.), for example.

User device 102 may be used to obtain information about one or more spaces (e.g., rooms) to be designed or redesigned. For example, a user (of user device 102) may desire to renovate a floor, wall, ceiling, etc., of a space. The user may desire to obtain information about the renovation, such as one or more dimensions of the space to be renovated, a predicted cost of the renovation, a predicted quantity of the material (e.g., architectural material) to be used for the renovation, the predicted dimensions of the material to be used for the renovation, a predicted display of the space with the desired renovation, etc.

The user may take one or more images of the room to determine information about the space and/or a renovation of the space. The image of the space may be taken via image capturing device 114 of user device 102. The user may take a single image of the space, or the user may take multiple images of the space (e.g., to capture different angles of the space).

The image of the space may be transmitted to materials modelling device 202 (further described with reference to FIG. 2). However, in examples all or some of the functions performed within a particular device may be performed by one or more of devices. For example, user device 102 may include architectural materials engine 230 in examples. In other examples, materials modelling device 202 may be external to user device 102.

In examples in which materials modelling device 202 is separate from user device 102, user device 102 may communicate with materials modelling device 202 via one or more wired and/or wireless techniques, as described herein. For example, as shown on FIG. 1, user device 102 may communicate with materials modelling device 202 via network 120. Network may be the Internet, in some examples. In other examples, as described herein, network 120 may be Wi-Fi, Bluetooth, LAN, etc.

User may take an image (e.g., a digital image) of a space (e.g., a room) and transfer the image to the materials modelling device 202. The image may relate to a space that the user desires to renovate (e.g., design or redesign). The user may also, or alternatively, provide information related to the image for the design/redesign. For example, the user may input the desired (e.g., potentially desired) renovations to occur within the room. The user may input that the desired design or redesign relates to replacing the ceiling of a room, the walls of the room, the floor of the room, etc. In some examples the user may input no additional details of the renovation. In other examples the user may input some (or all) ideas for the potential renovations. The user may input into the user device 102 one or more desired renovation ideas. The desired renovation ideas may be transferred to the materials modelling device 202, as shown on FIG. 1.

With the materials modelling device 202 having the image of the space and the desired renovation ideas of the space, the materials modelling device 202 may return information about the renovation. For example, the materials modelling device 202 may provide the dimensions of the space, architectural materials proposed to be used for the space, reverberation times of the space, and/or an image of the space with a recommended design or redesign of the space.

The materials modelling device 202 may also, or alternatively, return information about the architectural materials used in a potential design or redesign. For example, materials modelling device 202 may provide a predicted cost of the design/redesign, a predicted quantity of the material (e.g., architectural material) to be used for the design/redesign, and/or the predicted dimensions of the material to be used for the design/redesign. The materials modelling device 202 may provide the information to user device 102, which may provide the information to a user of user device 102. The information provided to the user via the user device 102 may be used by the user to select the architectural materials to be used in the space, including the type of the architectural materials to be used, the cost of the architectural materials to be used, the placement of the architectural materials, etc.

Figure 2:
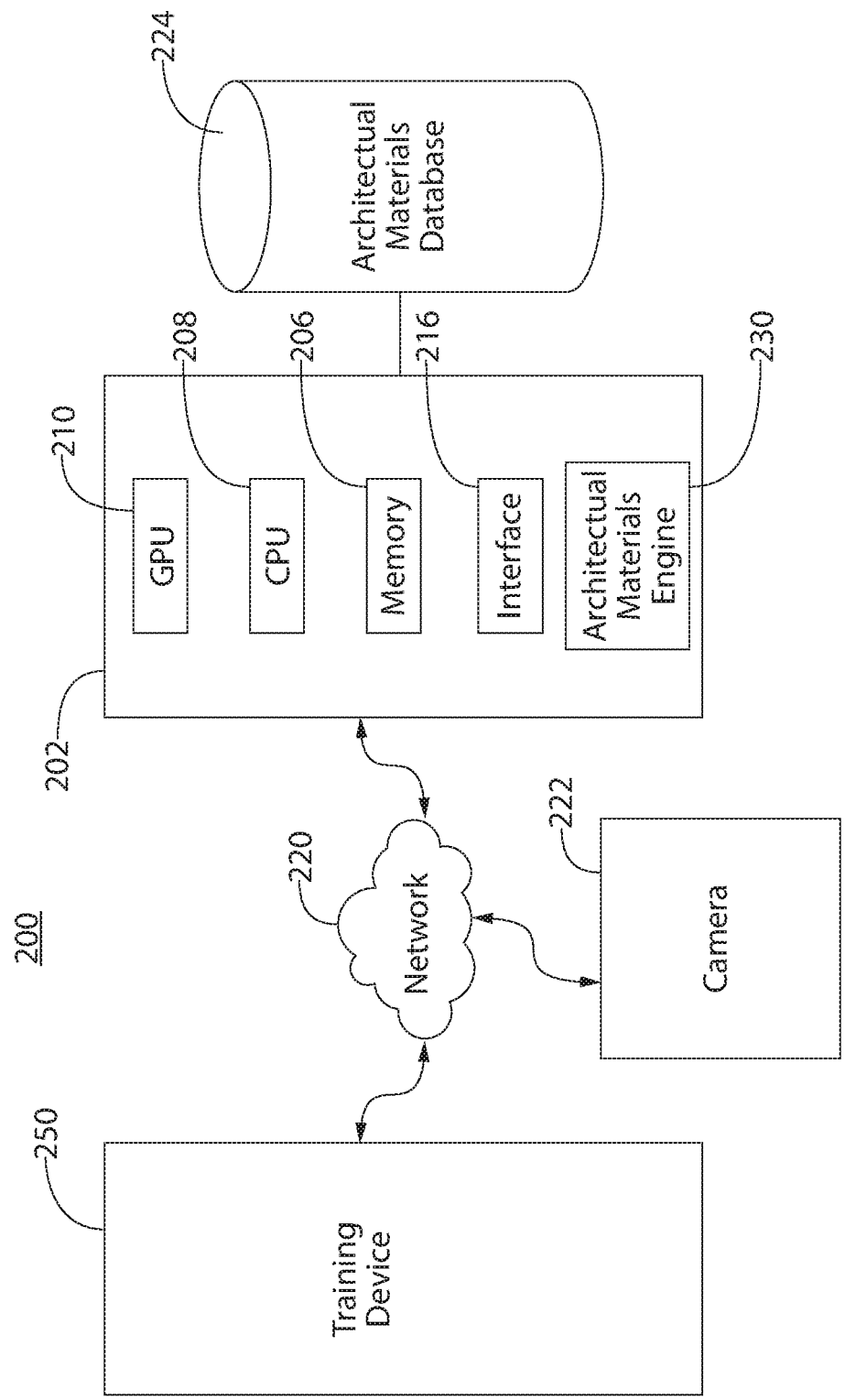
FIG. 2 is a block diagram of an example system including a materials modelling device.

FIG. 2 shows an example system 200 of training architectural materials engine 230 of materials modelling device 202. As shown on FIG. 2, training device 250 may communicate with materials modelling device 202. For example, training device 250 may communicate with materials modelling device 202 via network 220. Training device 250 may provide images to the materials modelling device 202, for example, to train the architectural materials engine 230 of materials modelling device 202, as described herein.

Training device 250 may provide an image of a space to materials modelling device 202, as well as information (e.g., actual, augmented, and/or estimated information) relating to image of the space, such as actual dimensions of the space within the image, architectural materials actually used for the space within the image, locations and/or descriptions of furniture, decoration(s), or other elements (e.g., windows, fireplaces, lights) within the space, annotations (e.g., descriptions and/or identifications) of elements (e.g., walls, floors, ceiling) of the space, identification of reference objects located within the space, reverberation times within the space, augmented measurements of one or more portions of the space, etc.

The accompanying information of the space may be based on actual information, such as the information (e.g., dimensions, reverberation times, locations, etc.) being actually measured within the space, the architectural materials being actually installed, and/or the cost of the architectural materials being actually computed. In addition, or alternatively, the accompanying information of the space may be based on augmented information, such as the information (e.g., dimensions, reverberation times, locations, etc.) being measured using augmented (e.g., computer generated) methods. For example, an augmented reality toolkit (e.g., iOS's Measure application, Google's AR Ruler application, etc.) may be used to digitally measure one or more portions of the room. Providing the additional information (e.g., the actual information and/or augmented information) to the architectural materials engine 230 may be used to train the model, using machine learning techniques, as described herein.

As shown on FIG. 2, materials modelling device 202 may include a CPU 208, memory 206, GPU 210, interface 216, and architectural materials engine 230. Memory 206 may be configured to store instructions executable on the CPU 208 and/or the GPU 210. The instructions may include machine readable instructions that, when executed by CPU 208 and/or GPU 210, cause the CPU 208 and/or GPU 210 to perform various acts. CPU 208 and/or GPU 210 may be configured to communicate with memory 206 to store to and read data from memory 206. For example, memory 206 may be a computer-readable non-transitory storage device that may include any combination of volatile (e.g., random access memory (RAM), or a non-volatile memory (e.g., battery-backed RAM, FLASH, etc.) memory.

Interface 216 may be configured to interface with one or more devices internal or external to materials modelling device 202. For example, interface 216 may be configured to interface with training device 250 and/or architectural materials database 224. Architectural materials database 224 may store information about spaces, such as images of spaces, dimensions of the spaces, architectural materials (e.g., architectural materials used in a room, including the type, quantity, cost, location, etc.), elements (e.g., floors, walls, ceilings, windows, doors, televisions) within a space, furniture found within the space, decorations found within the space, etc. The information stored within architectural materials database 224 may be used to train the architectural materials engine 230. The information stored within architectural materials database 224 may also, or alternatively, be referenced by architectural materials engine 230 for determining (e.g., predicting) information about a space.

Architectural materials database 224 may store images of the space before the space has been renovated, during renovation of the space, and after completion of the renovation. Information relating to the architectural materials may be provided based on the stage of the renovation. For example, the type, quantity, cost, location, etc. of the architectural materials may be stored in the architectural materials database 224 based on the stage of the renovation (e.g., before, during, and post renovation).

Materials modelling device 202 may receive one or more images of a space via training device 250 and/or another device (e.g., camera 222). For example, training device 250 may provide images of one or more spaces to the materials modelling device 202. The images may be of many different spaces. For example, the images may be of many different family rooms, dining rooms, basements, kitchens, conference rooms, hotel rooms, lobbies, etc. The images provided to materials modelling device 202 may be of a same space. For example, the images of a single room, during one or more renovations, may be provided to materials modelling device 202. As described herein, additional information may be provided to materials modelling device 202 for each image provided to the materials modelling device 202. For example, for an (e.g., each) image provided, the materials modelling device 202 may receive actual dimensions of the space, actual quantities of architectural materials used, actual costs of quantities used, and actual post-renovation images of the space.

Materials modelling device 202 may use machine learning techniques to develop a software application (e.g., a model). For example, architectural materials engine 230 may include a model (e.g., a machine learning model) to determine (e.g., predict) information regarding a space. The information provided to and/or by the model may include dimensions of a space, reverberation times within a space, and/or architectural material information (e.g., type, placement, etc.), based on an image of the space. A dimension (e.g., distance) may be determined using pixel-to-length ratio techniques. For example, a length of a wall in an image may be determined (e.g., estimated) by determining the pixel-to-length ratio of the length of the wall. Machine learning rules may use pixel-to-length ratio techniques when estimating dimensions of a space, for example.

The information provided to and/or by the model may also, or alternatively, include the locations and/or identifications of reference objects within a space. The reference objects may be used to determine dimensions within an image. For example, the size of a reference object may be known. By comparing distances of elements within the image with the (known) size of the reference object, the dimensions of the elements within the room may be determined.

In examples, the information provided to the model may include factors that differentiate an element of a room with another element of the room. For example, the information may include a factor (such as a vertical corner, recessed lights, windows, furniture attributes) that can be used to differentiate a wall and a floor, a wall and a ceiling, a piece of furniture with a wall/floor, etc.

The model may improve its ability to perform a task as it analyzes more data related to the task. The task may be to predict an unknown attribute or quantity from known information. For example, the task may be to predict the dimensions of a room based on an image of the room. In such an example, the more images (and information related to each of the images) provided to the model, the better the results from the model will be. For example, the model may provide more accurate determinations of dimensions of the space based on the model receiving numerous images of the space and information related to the dimensions of the space.

As described herein, the machine learning model may be trained using a set of training examples. Each training example may include an example of an object, along with a value for the otherwise unknown property of the object. By processing a set of training examples that include the object and/or the property value for the object, the model may learn what attributes or characteristics of the object that are associated with a particular property value. This learning may then be used to predict the property or to predict a classification for other objects. As described herein machine learning techniques (e.g., rules, algorithms, etc.) may be used to develop models of various spaces.

For example, machine learning rules may be used to determine (e.g., develop or predict) dimensions of spaces, to determine reverberation times within a space, to determine a presence, type, size, and/or location of a reference object within the space, and/or to determine architectural materials used within the spaces. The machine learning rules may use one or more images of the space, as well as one or more other images (and information relating to the other images) to determine the above. The machine learning rules may identify and/or classify objects in the space as a person, furniture, a window, a door, or an architectural material.

For example, models may be developed to receive an image of a space to determine (e.g., predict) information of the space. Training examples (e.g., training sets or training data) may be used to train the architectural materials engine 230 and may include images of one or more spaces, as well as the information described herein regarding the space. For example, the training data may include the dimensions of the space, the architectural materials used in the space, the physical location of a space, a time of day, a date, a reverberation time of the space, information relating to a reference object within the space, a classification of the space (e.g., cluttered, empty, family room, conference room, etc.). After training the architectural materials engine 230 (e.g., the machine learning model of architectural materials engine 230) using the training data, the architectural materials engine 230 may be used to predict parameters having similar characteristics as provided in the training data. For example, if architectural materials engine 230 is provided with data sets of an image of a space and defined dimensions of the space, the architectural materials engine 230 may later determine unknown dimensions of a space if given an image of a space (e.g., the same space or a different space).

As described herein, the space in which information (e.g., dimensions of the space, architectural materials used in the space, reverberation time, etc.) is unknown may be the same as the space in which one or more images are provided to architectural materials engine 230 to train the architectural materials engine 230 (e.g., the model of architectural materials engine 230). In other examples, the space in which information (e.g., dimensions of the space, architectural materials used in the space, reverberation time, etc.) is unknown may be different than the space in which one or more images are provided to architectural materials engine 230 to train the architectural materials engine 230 (e.g., the model of architectural materials engine 230). For example, a user may desire to renovate a family room. The user may desire to determine the dimensions, architectural materials to be used, reverberation time, etc. of the family room. In examples the architectural materials engine 230 may have received (e.g., previously received) images of the family room to train the architectural materials engine 230. In other examples the architectural materials engine 230 may not have received (e.g., previously received) images of the family room to train the architectural materials engine 230. In one or more of the examples described above, images of other spaces may have been provided to the architectural materials engine 230 to train the architectural materials engine 230. Additional images of spaces may be provided to the architectural materials engine 230, for example, to improve the accuracy of the machine learning rules. To train (e.g., continually train) the architectural materials engine 230, a user may provide actual information and/or estimated information (e.g., estimated dimensions) of the space that relate to the images. For example, when training the architectural materials engine 230 the user may provide an image and estimated information of the space within the image. The estimated information may be in place of, or to supplement, actual information used to train the model.

The images included in the training data may be selected and/or input into the model of architectural materials engine 230 based on a particular category. For example, a category of the space (e.g., family room, conference room, basement, etc.) may be selected and/or input into the model as the images of the space are input into the architectural materials engine 230. Properties, such as empty, cluttered, windowless, etc., may be input into the training model to further classify the images. Known values input into the architectural materials engine 230 (e.g., for training purposes) may be based on experimentation, simulation, analysis, and/or assumptions regarding the property being modeled. For example, actual (e.g. actually measured) dimensions of the spaces may be input into the model as images of the spaces are input into the model, actual reverberation times may be input into the model as images of the spaces are input into the model, assumed dimensions of the spaces may be input into the model as images of the spaces are input into the model, etc.

A training set (e.g., previous images and information relating to the image) may be used to train architectural materials engine 230. The architectural materials engine 230 (e.g., model) may perform a selected machine learning rule or algorithm using the training set, as described herein. Once trained, the model may be used to generate a prediction about the image, relative to the property of interest. For example, based on an image the model may be configured to predict the dimensions of a room, quantity of a material used in the room, etc. In an example, the dimensions of the room may be the property of interest. When an image is supplied to the trained model, the output may comprise a prediction regarding the dimensions of the room being modeled for the image. The predictions may take the form of a value from a continuous range of values or from a discrete value, for example.

System 100 and/or system 200 may be implemented using any available computer system and adaptations contemplated for known and later developed computing platforms and hardware. Further, the methods described herein may be carried out by software applications configured to execute on computer systems ranging from single-user workstations, client server networks, large distributed systems employing peer-to-peer techniques, or clustered grid systems. In an example, a high-speed computing cluster may be used. The computer systems used to practice the methods described herein may be geographically dispersed across local or national boundaries using a data communications network such as the Internet. Moreover, predictions generated by the architectural materials engine 230 at one location may be transported to other locations using well known data storage and transmission techniques, and predictions may be verified experimentally at the other locations.

The architectural materials engine 230 may include currently known and/or later developed machine learning rules or algorithms. For example, the architectural materials engine 230 may include at least one of Boosting, a variant of Boosting, Alternating Decision Trees, Support Vector Machines, the Perceptron algorithm, Winnow, the Hedge Algorithm, an algorithm constructing a linear combination of features or data points, Decision Trees, Neural Networks, logistic regression, Bayes nets, log linear models, Perceptron-like algorithms, Gaussian processes, Bayesian techniques, probabilistic modeling techniques, regression trees, ranking algorithms, Kernel Methods, Margin based algorithms, or linear, quadratic, convex, conic or semi-definite programming techniques or any modifications of the foregoing.

Figure 3:
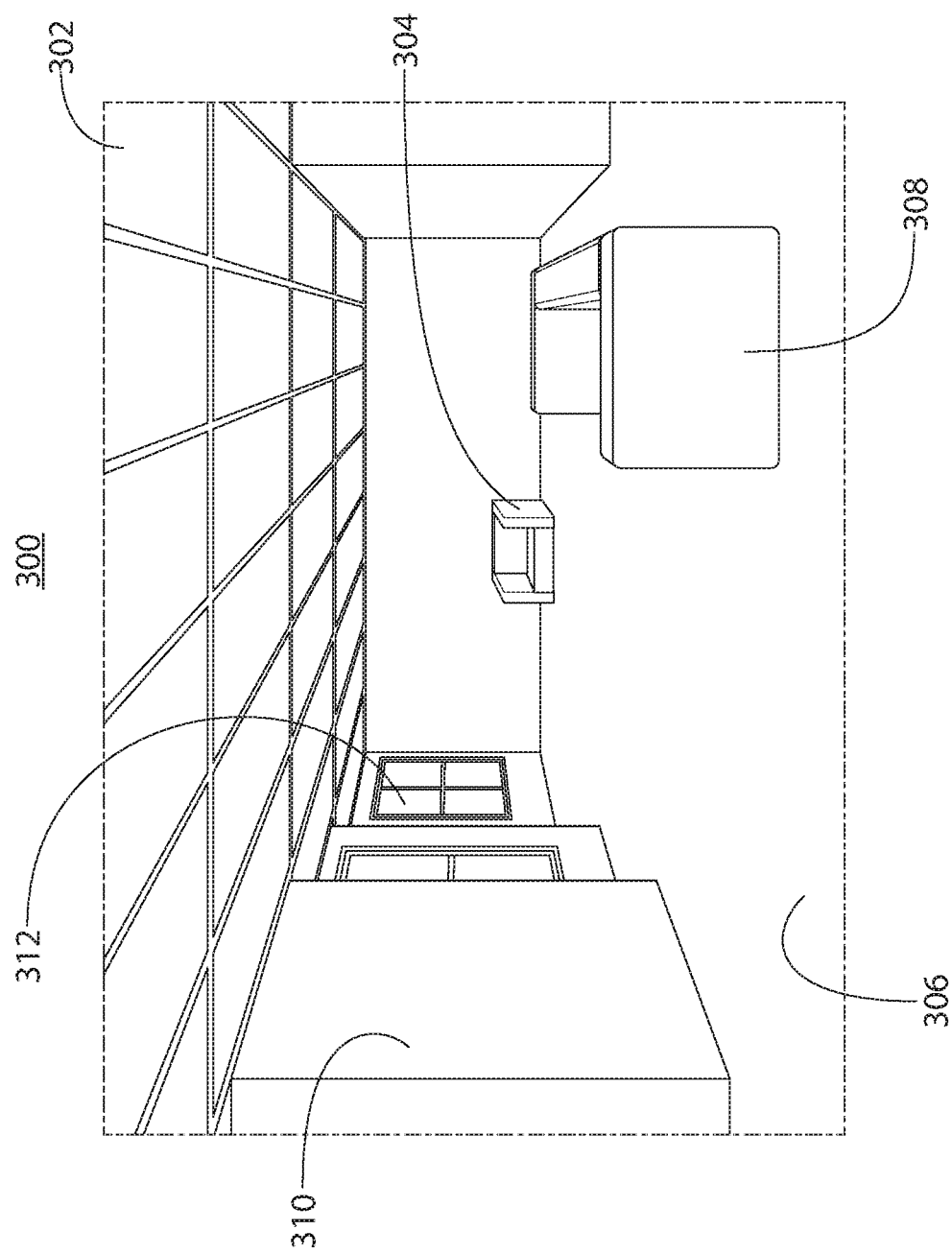
FIG. 3 is an image of an example space (e.g., room) in which a design or redesign may be desired.

FIG. 3 is an image of an example space 300. A user may desire to perform a design or redesign (e.g., renovation) of the space 300. For example, a user may desire to renovate the ceiling 302, floor 306, wall 310, fixture, etc. of space 300. The user may desire to obtain dimensions of the space 300 and/or a reverberation time of space, for example, to perform a renovation of the space 300. The user may desire to obtain dimensions of the space 300 so that the quantity and/or cost of architectural materials may be determined. The quantity and/or cost of architectural materials may be displayed, for example, via display 112 after dimensions of the space are determined.

The dimensions of the space may be determined via predicted (e.g., estimated) reverberation times. For example, information relating a known reverberation time of an image of a space with a known dimension of the image of the space may be provided to the architectural materials engine. The user may provide an image to the architectural materials engine, and the architectural materials engine may provide a predicted reverberation time of the space within the image. In other examples, a dimension of space may be predicted based on a reverberation time. For example, the estimated reverberation time may be provided to the architectural materials engine to determine an estimated dimension of the space.

As described herein, the user may take a picture of a space using user device 102 (shown on FIG. 1), or another device (e.g., a camera). The user may provide the image to materials modelling device 202 (e.g., architectural materials engine 230 of materials modelling device 202), so that the dimensions of the space can be determined and/or the architectural material information (e.g., type of architectural material, quantity of architectural material, cost of architectural material, etc. may be determined).

The architectural materials engine 230 may determine the dimensions of the space and/or the reverberation time of the space 300, as described herein. For example, the architectural materials engine 230 may use machine learning to determine the dimensions of the space 300, the reverberation time of the space 300, and/or architectural materials within space 300, based on the image. The architectural materials engine 230 may differentiate one or more elements (e.g., wall, ceiling, fixture, window) of a space within an image from one or more other elements of the space. For example, the architectural materials engine 230 may identify a window or door. The architectural materials engine 230 may differentiate the window/door from a wall. The architectural materials engine 230 may differentiate a fixture from a window/door and/or from one or more other fixtures.

The architectural materials engine 230 may differentiate elements of a space according to one or more categories. For example, the architectural materials engine 230 may identify and/or categorize elements as coverable elements, non-coverable elements, concealing elements, etc. A coverable element may be an element that is intended to be covered by an architectural material. For example, a wall within a room may be a coverable element if the wall is desired to be covered with an architectural material. A non-coverable element may be an element that is intended not to be covered by an architectural material. For example, a door within a room may be a non-coverable element if the wall is desired to be covered with an architectural material but the door is desired not to be covered with the architectural material. A concealing element may be an element that conceals another element. For example, the concealing element may conceal a coverable element, a non-coverable element, and/or another concealing element. A person within a room (e.g., an image of the room) may be concealing element in some examples and a non-coverable element other examples.

As those of skill in the art will understand, the dimensions of the coverable elements may be related (e.g., directly related) to the amount of architectural material used for a design or redesign. For example, if a wall is to be covered with an architectural material, the wall will be the coverable element. It is the dimensions of the wall that will relate to the quantity and/or cost of the architectural material used for covering the wall. If a door and/or window is found on the wall, the door and/or window may be non-coverable elements (if it is desired that the door and/or window are not to be covered). As a result, the dimensions of the door and/or windows will not relate to the quantity and/or cost of the architectural material used for covering the wall. Along those same lines, if a concealing element is positioned in front of a coverable element (e.g., in front of a coverable element within an image), the dimensions of the concealing element that is in front of the coverable element will relate to the quantity and/or cost of the architectural material used for covering the wall. In contrast, if a concealing element is positioned in front of a non-coverable element (e.g., in front of a non-coverable element within an image, such as a window), the dimensions of the concealing element that is in front of the non-coverable element will not relate to the quantity and/or cost of the architectural material used for covering the wall.

As described herein, for the architectural materials engine 230 to determine the dimensions of the space 300, differentiations of elements within a space, and/or architectural materials within a space, machine learning rules may utilize previously submitted images of space in which actual dimensions of the space, differentiations of the space, and/or architectural materials of the room were also provided to the architectural materials engine 230. In an example, materials modeling device 202 may use the dimensions of the space 300 and known characteristics of the architectural materials (such as the price of the architectural materials for the determined dimensions) to provide the cost of the renovation.

Space 300 may be empty when the image is taken, or the space 300 may contain one or more items. For example, as shown on FIG. 3, the space 300 may include objects that are not related to the renovation, such as couch 308, window 312, box 304, etc. To determine the dimensions of a space, the architectural materials engine 230 may differentiate between elements in the space that are related to the renovation (e.g., coverable element, such as ceiling 302) and elements in the space that are unrelated to the renovation (e.g. concealable element, such as couch 308). By distinguishing between coverable elements, non-coverable elements, and concealable elements, accurate dimension calculations may be made.

Figure 4:
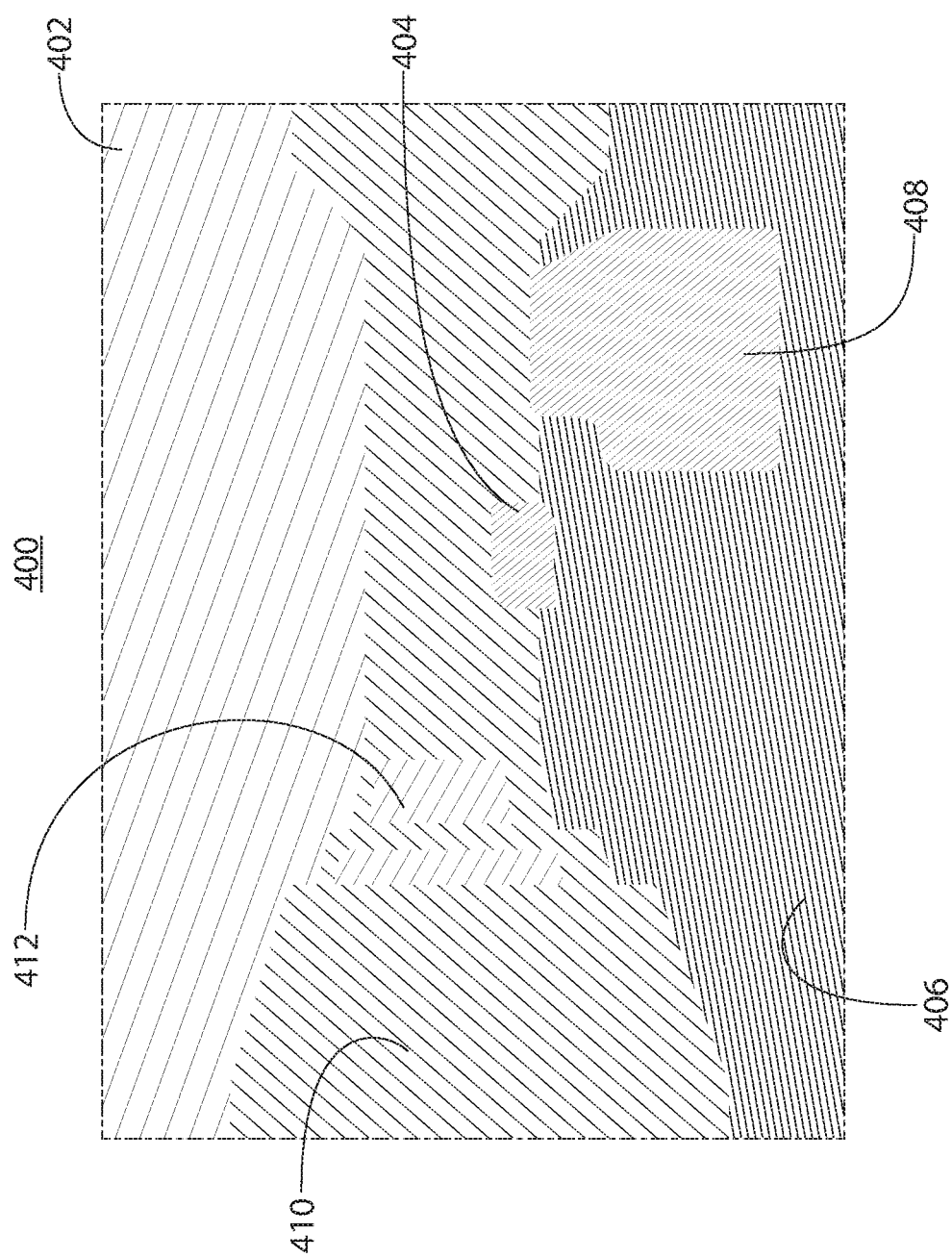
FIG. 4 is an example annotation of the space as shown on FIG. 3.

FIG. 4 shows an example image 400 of space 300, in which elements of the space are differentiated. Elements of space 300 may be differentiated via a user (e.g., via a user of the user device 102) and/or via the architectural materials engine 230, for example, using machine learning techniques.

As shown on FIG. 4, elements within a space 400 may be differentiated within an image of the space 400. For example, FIG. 4 shows ceiling 402, floor 406, and wall 410, each of which may be related to a renovation (e.g., each of which may be coverable elements). Image 400 may also, or alternatively, show elements that are unrelated to a renovation of a space, such as non-coverable windows 412, chair 404, and couch 408. Elements related to the renovation may be differentiated from one another and/or elements related to the renovation may be differentiated from elements unrelated to the renovation. By differentiation elements from one another, dimensions may be determined of one or more of the elements of a space, as described herein. For example, by differentiating wall 410 and floor 406, an accurate dimension may be determined for the wall and/or the floor. Further, by differentiating between couch 408 and floor 406, an accurate dimension may be determined for the floor 406 (e.g., by disregarding the couch in the determination of the floor 406).

Figure 5:
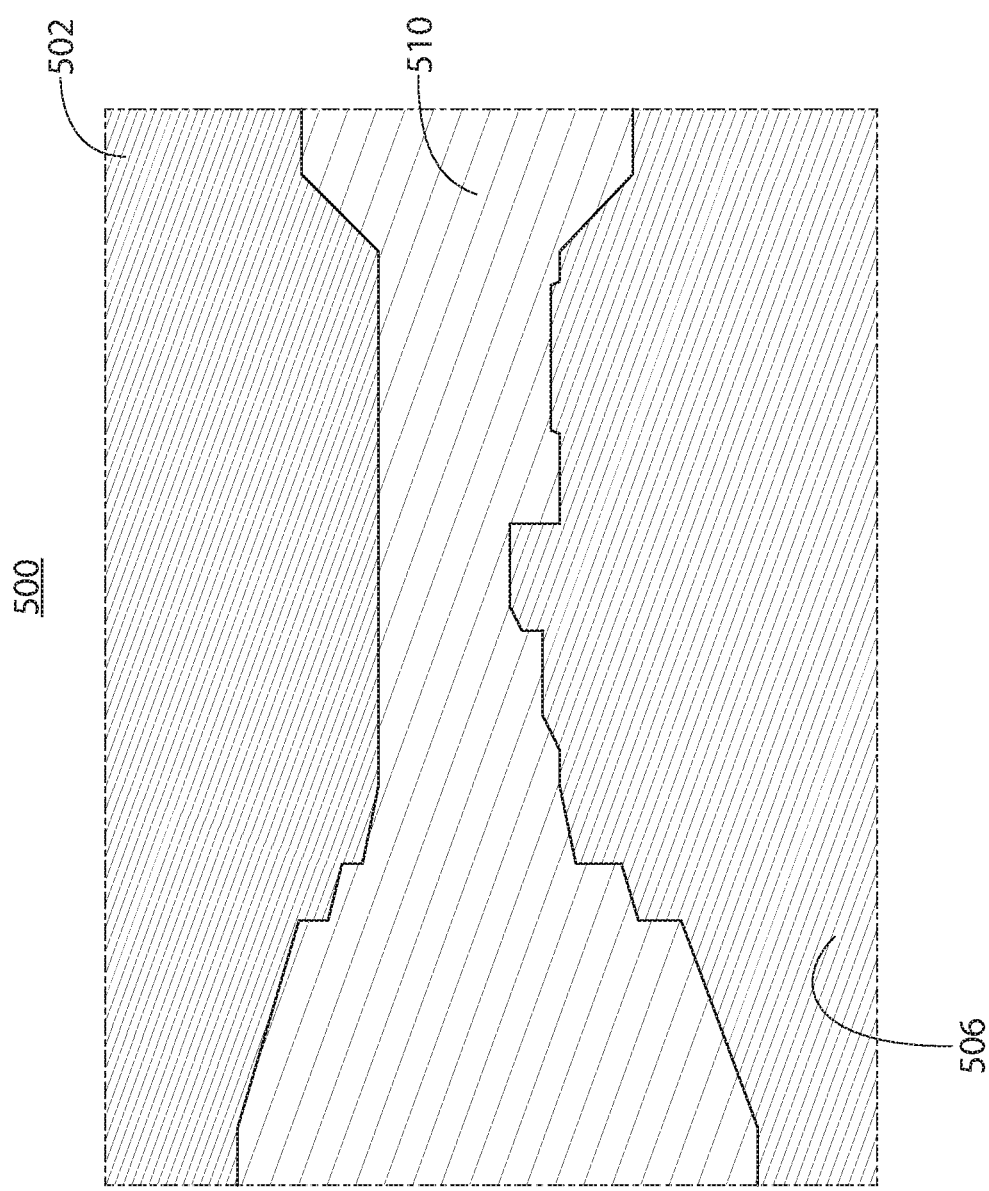
FIG. 5 is an example discrimination of surfaces of the space as shown in FIGS. 3 and 4.

FIG. 5 shows an example space 500 in which the elements of the space are further differentiated. For example, as shown on FIG. 5, wall 510, ceiling 502, and/or floor 506 may be further differentiated from one another. The elements unrelated to a renovation, such as couch and/or chair, may be excluded (e.g., entirely excluded) from a determination of the element related to a renovation. For example, the couch (of 400) is removed (e.g., substantially removed) from floor 506 and the chair (of 400) is removed (e.g., substantially removed) from wall 510. By removing elements unrelated to a renovation, a more accurate determination can be made for the elements in which the renovation is related. For example, with couch removed from floor 506, a more accurate determination of floor 506 can be made. The dimensions of the elements may be determined via architectural materials engine 230. In examples, architectural materials engine 230 may determine the boundaries and/or dimensions of wall 510, ceiling 502, and/or floor 506 based on machine learning techniques. The boundaries and/or dimensions of wall 510, ceiling 502, and/or floor 506 may be determined via other methods, for example, via user input.

Architectural materials engine 230 may determine elements unrelated to a renovation based on machine learning techniques, as described herein. The architectural materials engine 230 may exclude unrelated elements from the dimension analysis. For example, architectural materials engine 230 may determine that a couch, a box, a window, etc., are not related to a renovation of a wall based on previous images that trained the machine learning model. The previous images used to train the model may have been annotated, for example, by a user to distinguish elements of a space with other elements of the space. By training the model with the previous images, the architectural materials engine 230 may predict factors that differentiate one element from another element. Thus, when determining the dimensions of a wall in a present image, the architectural materials engine 230 may exclude the couch, box, and/or window based on previous images having a couch, box, and/or window. By then excluding the elements unrelated to the renovation, the dimensions of the area may be determined for the renovation. In such a manner, the unrelated elements will not be factored into the determination of the wall, for example.

Figure 6:
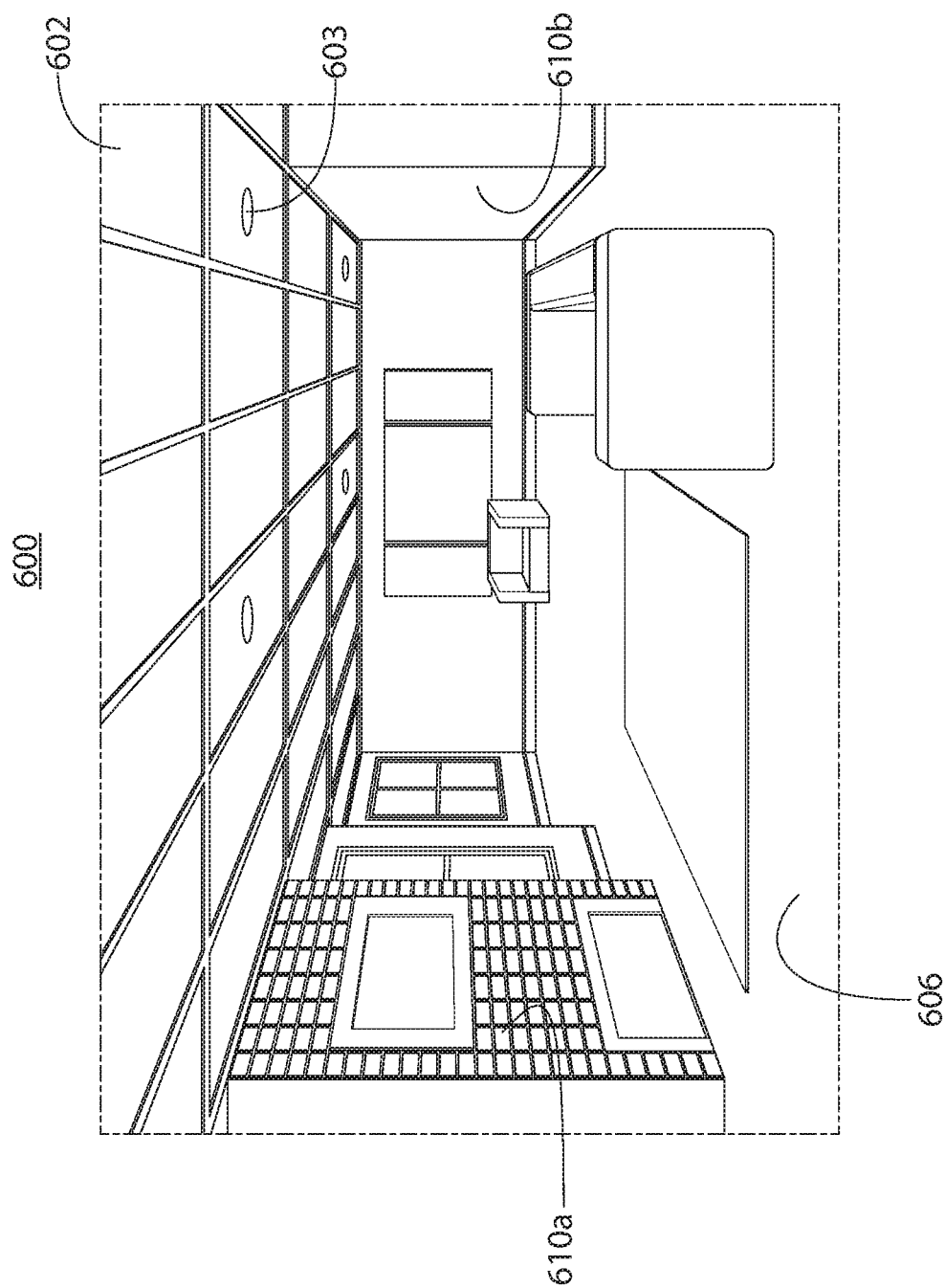
FIG. 6 is an example display of the space of FIG. 3, in which the space includes recommended architectural materials.

FIG. 6 shows an image of space 600 in which architectural materials are presented upon the space (such as space 300, which did not include some of the architectural materials presented in 600). For example, room 600 shows a brick façade 610a presented upon a wall (e.g., wall 310 of room 300) and/or recessed lights 603 presented upon a ceiling (e.g., such as ceiling 302 of FIG. 3). In other examples, no additional architectural materials may be presented, such as 610b being the same as shown on FIG. 3.

The architectural materials presented in space 600 may be determined based on previously determined dimensions of the space, desired architectural materials of the user, and/or machine learning techniques. In some examples, the desired architectural materials may be provided by the user, while in other examples the architectural materials may be provided automatically based on a style (e.g., a user's style, a current style, a geographical style, etc.), a physical fit of the architectural materials to the room, random selection, and so forth.

Additional elements may be presented in image 600. The additional elements may be determined based on the dimension of a space (e.g., room 300), the lighting of the space, the windows/doors of the space, etc. For example, architectural materials engine 230 may determine that a fireplace may be desired in space 300. In other examples the architectural materials engine 230 may predicted desired furnishings of space, such as a table, chairs, area rug, couch, painting, etc., that may be provided in the space. The furnishings of the space may be based on an input of the user, such as a user's style that is provided, an amount of tables/chairs desired, etc.

Figure 7:
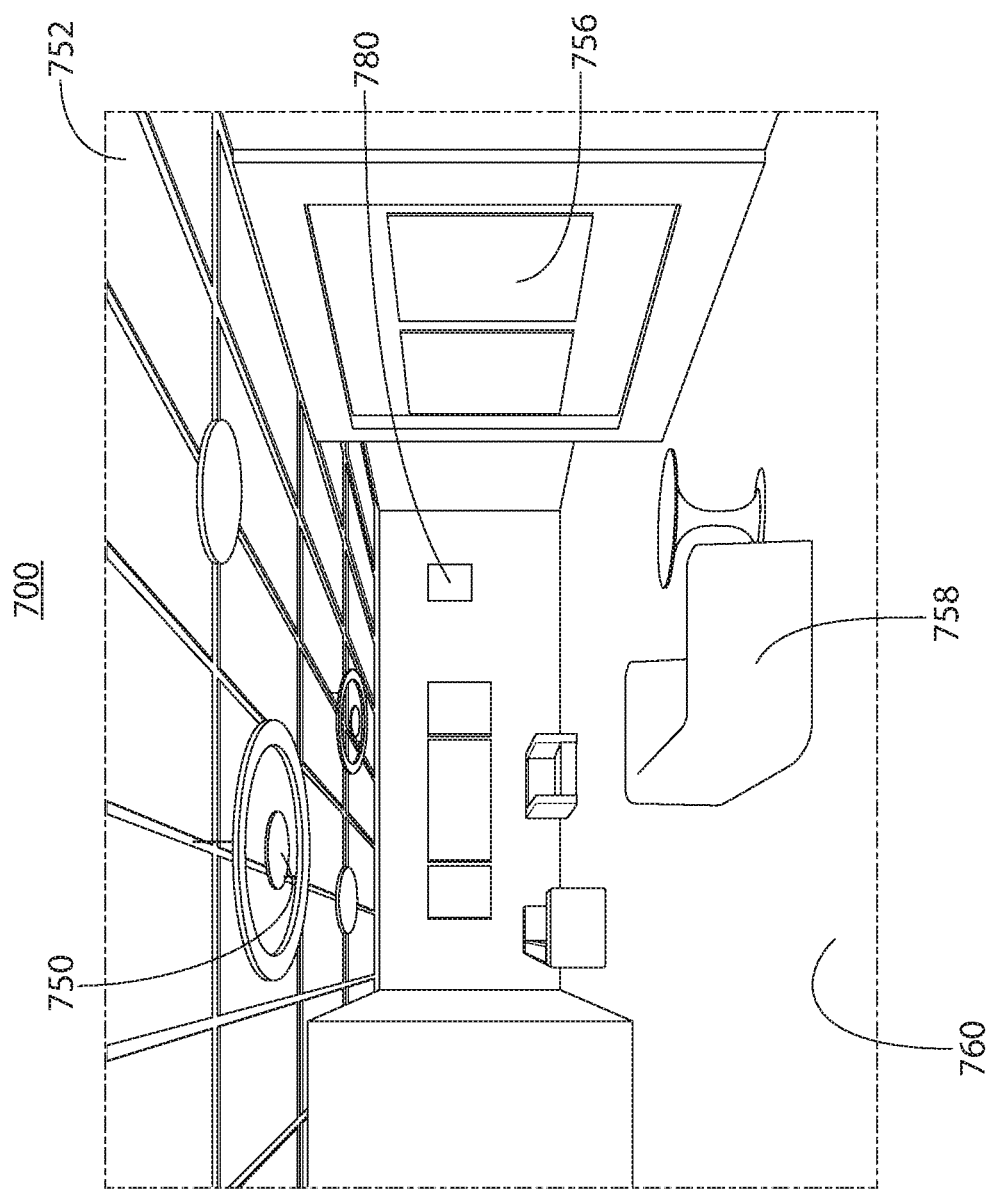
FIG. 7 is an example of an image of another space in which a design or redesign may be desired.

FIG. 7 shows an image of an example space in which the image is to be supplemented with annotations (FIGS. 8A, 8B). For example, space 700 shows elements that include light fixture 750, ceiling 752, wall 754, television 756, couch 758, and floor 760. As described herein, some of the elements in space 700 may be related to a renovation, and some of the elements in space are unrelated to a renovation.

Space 700 shows a reference object 780. Reference object 780 may be used to assist in the determination of dimensions of space 700. Reference object 780 may be an item of a known size. Reference object 780 may be of adequate size such that the known size can be differentiated from sizes of one or more elements within space 700. For example, if the size of the reference object 780 is too small (e.g., too far away from the camera to be accurately resolved), the accuracy and/or precision of the dimension measurements of elements within the space 700 may be reduced. The reference object 780 may be a standard object (e.g., with known size and/or shape) or the reference object 780 may be a non-standard object. If the reference object 780 is a non-standard object, the user may input (e.g., manually input) the size and/or shape of the object. If the reference object 780 is a common item (e.g., having a standard dimension and/or shape), user device 102 and/or materials modelling device 202 may determine the dimension and/or shape of the rejection object 780. The user can select (such as via a drop-down menu) the identity and/or shape of the object. In such examples, user device 102 and/or materials modelling device 202 may retrieve the reference object's dimensions from a database containing the size and/or shape attributes of known objects similar to the reference object 780. By knowing the size and/or shape of the reference object 780, the known dimensions and/or shape of the reference object 780 may be used to determine (e.g., estimate) one or more elements of the space 700, including the entire space, one or more walls, the ceiling, the floor, furniture, decorations, windows, etc.

Elements in an image (such as image 700) may be annotated, for example, by a user and/or by the architectural materials engine 230. The user may annotate the elements when training the architectural materials engine 230 in some examples. The user may also, or alternatively, annotate the elements when submitting an image (e.g., image 700) for a room dimension prediction, an architectural materials prediction, etc. FIG. 8A shows an example legend listing annotations associated with space 800, depicted in FIG. 8B. For example, element 850 is a lighting fixture in FIG. 8B and is annotated as a ceiling object in FIG. 8A. Element 852 is a ceiling in FIG. 8B and is annotated in FIG. 8A as ceiling—other. Element 856 is a television in FIG. 8B and is annotated as a wall—glass in FIG. 8A. Element 860 is a floor in FIG. 8B and is annotated as a floor in FIG. 8A. By annotating the elements within a room, the dimension determinations of the elements within the room (including the room itself) may be more accurate. For example, by annotating 850 as a ceiling object (e.g., a light), the overall ceiling dimension may be reduced by the size and quantities of the light object located on the ceiling. Because light fixtures may not use the same architectural materials used in renovating a ceiling (e.g., drywall), in reducing the overall ceiling dimension by the size and quantities of the lights, an accurate determination of architectural materials (e.g., ceiling materials) for the ceiling may be determined.

An image may be focused on a particular portion (e.g., surface) of a space. For example, an image may be focused on a particular surface of a space if the particular surface of the space is the only surface of the space to be renovated. By focusing on a particular surface of the space, a more accurate dimension determination may be made for the particular surface of the space. For example, by focusing on a particular surface of a space, a larger image of the particular surface of the space may be provided. A larger image of the surface may include additional pixels of the surface, compared to a smaller image of the surface of the space. Additional pixels may provide a more accurate determination, as the pixels may be enlarged to be used as reference objects, for example. By focusing on a particular surface of an image, unrelated elements be excluded from the image, which may result in a more accurate dimension analysis as the potential for confusion of unrelated and related elements may be reduced.

Figure 9:
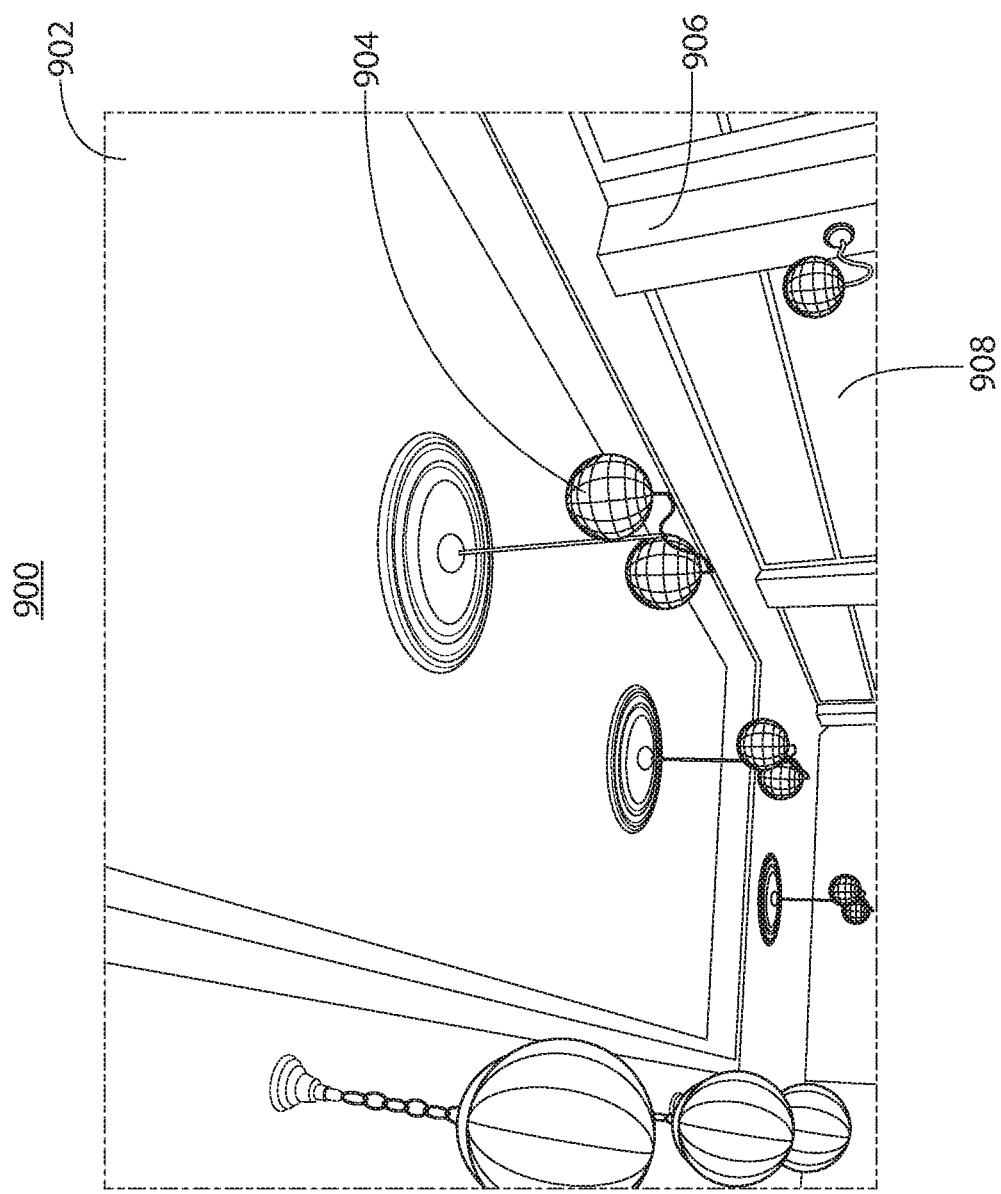
FIG. 9 is an example of an image of a surface of another space in which a design or redesign may be desired.
Figure 10B:
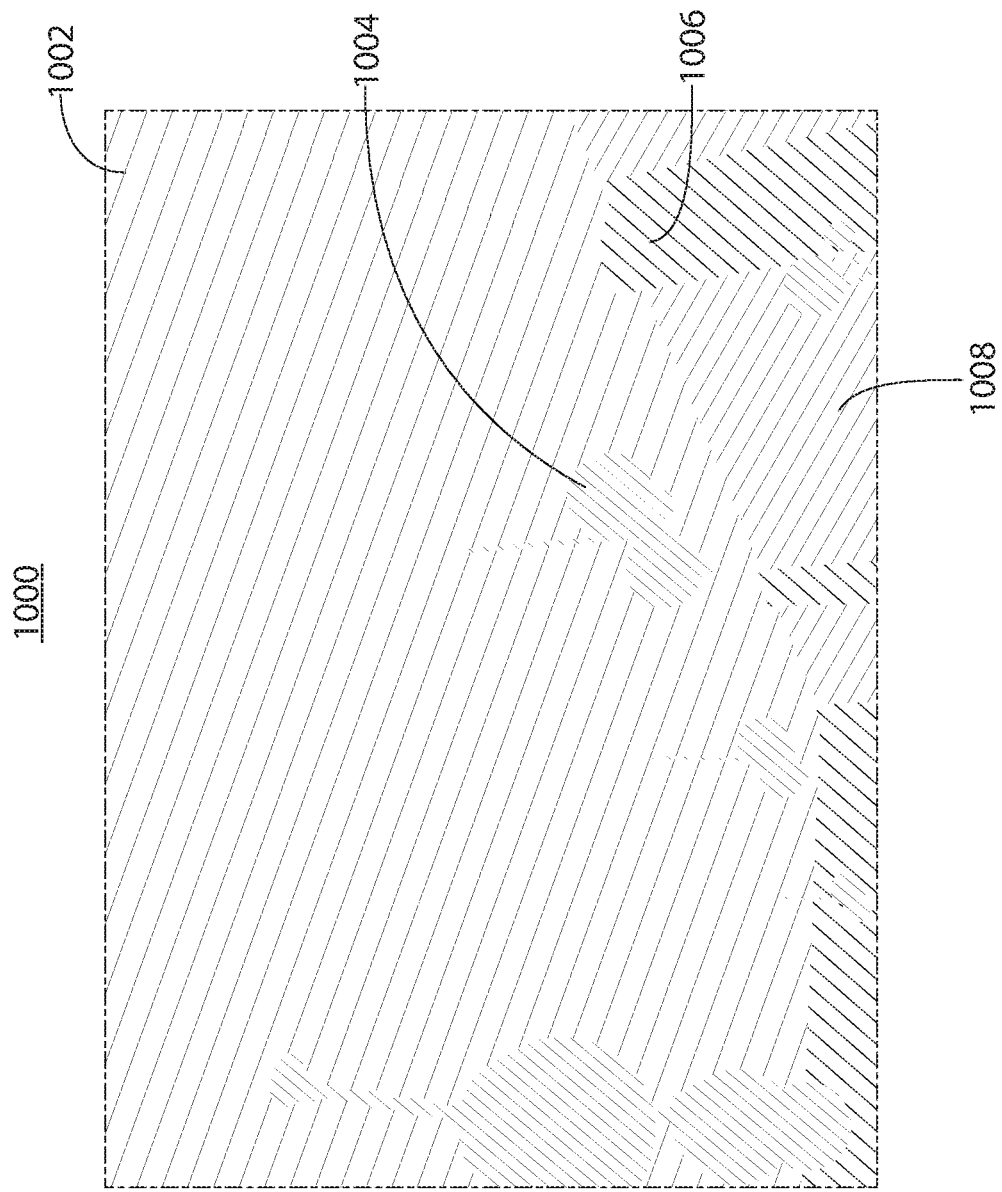
FIGS. 10A, 10B are example annotations of the room as shown on FIG. 9.
Figure 10A:
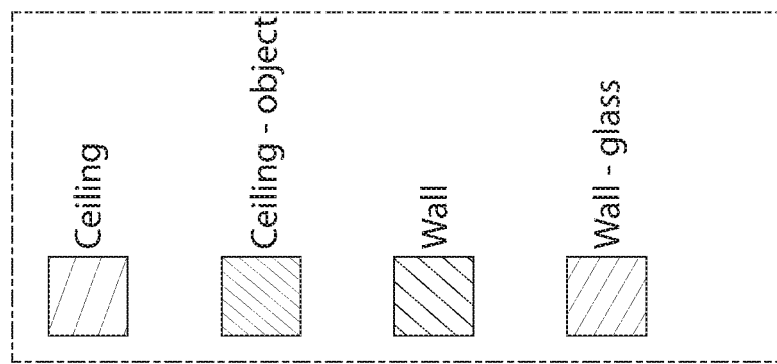

FIG. 9 shows an image of an example space 900 in which the image is to be supplemented with annotations (FIGS. 10A, 10B). FIG. 9 shows an image focused on an example ceiling 902 of a space 900. The ceiling 902 includes multiple light fixtures 904. Although FIG. 9 focuses on ceiling 902 of space 900, FIG. 9 shows other surfaces of space 900, such as wall 906 and windows 908.

FIG. 10A shows an example legend listing annotations associated with room 1000, depicted in FIG. 10B. In particular, FIG. 10A shows a legend of the annotated elements shown on FIG. 10B. For example, element 1002 is a ceiling in FIG. 10B and is annotated as a ceiling object in FIG. 10A. Element 1004 is a light fixture in FIG. 10B. and is annotated as a ceiling—other in FIG. 10A. Element 1006 is a surface of a wall in FIG. 10B and is annotated as a wall—drywall in FIG. 10A. Element 1008 is a window in FIG. 10B and is annotated as wall—glass in FIG. 10A. As described herein, the annotations of the space provide for a more accurate determination of the space. For example, by determining the elements that are related to a renovation and the elements that are unrelated to the renovation, a determination may be performed on only the related elements.

Figure 11:
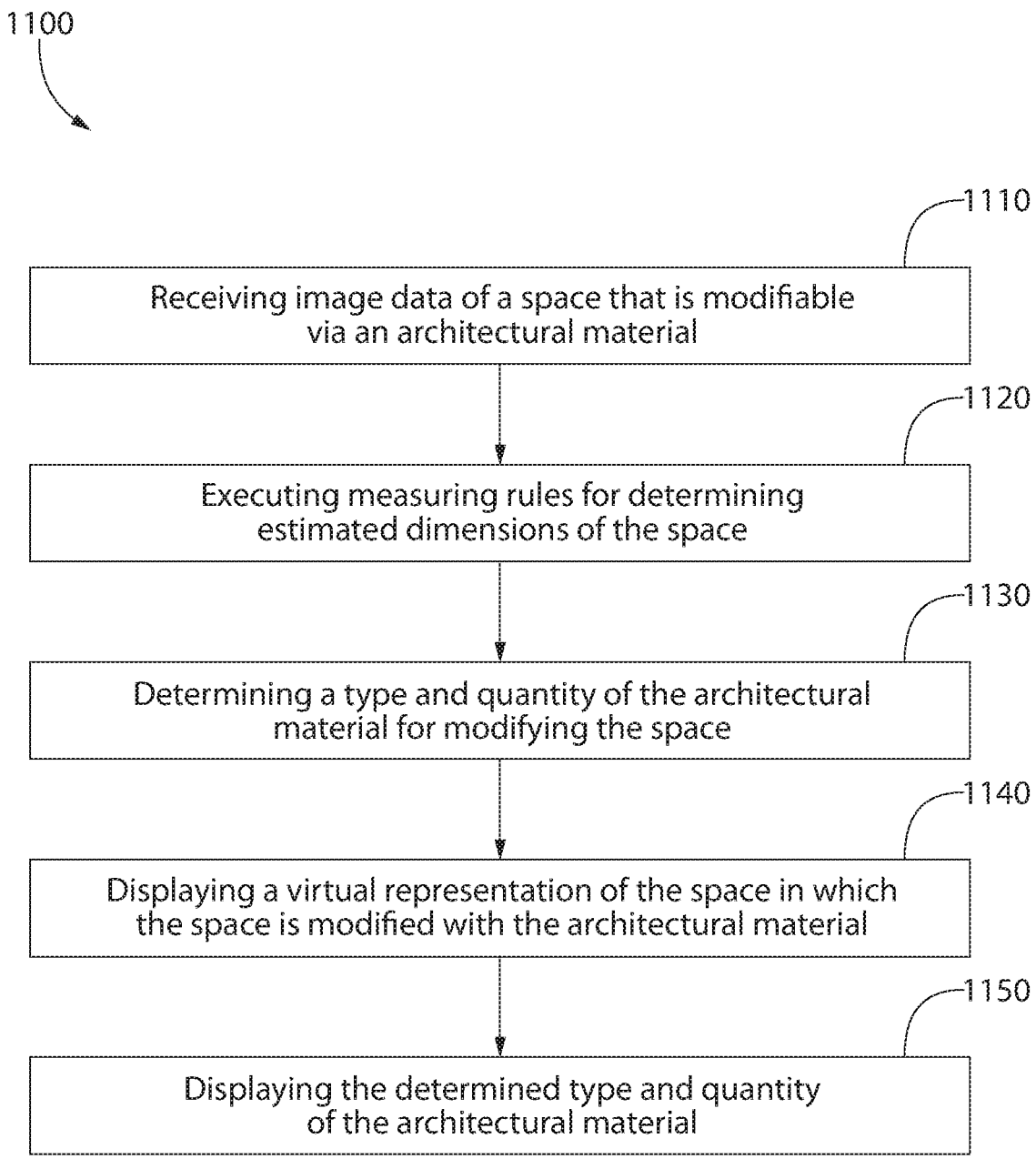
FIG. 11 is an example method of determining architectural materials for a design or redesign, as described herein.

FIG. 11 shows an example method 1100 for determining architectural materials based on an image of a room (such as room 300, shown on FIG. 3). At 1110, image data of a space may be received. The image data may be of a room (e.g., an entire room, a surface of a room), etc. The image data may be received at a materials modelling device having an architectural materials engine. The materials modelling device may receive the image from a user device, a camera, a training device, etc., as described herein. The image may be annotated. For example, the image may be annotated so that the ceiling, floor, walls, couch, windows, etc., are differentiated. A reference object may be placed in the room.

At 1120, measuring rules may be executed. The measuring rules may be executed based on a model, such as a machine learning model. The measuring rules may provide estimated dimensions of the room, for example, estimated dimensions of a wall, ceiling, and/or floor of a room. The estimated dimensions may be based on information provided to the architectural materials engine. For example, the estimated dimensions may be based on previous images and actual information (e.g. actual dimensions) provided to the architectural materials engine relating to the previous images while training the engine. The estimated dimensions may be based on a relationship with the actual dimensions. The estimated dimensions of the space may be based on (e.g., only based on) elements related to the renovation of the space. For example, the estimated dimensions of a space may be based on a wall, ceiling, and/or floor to be renovated. The estimated dimensions of the space may not be based on unrelated elements of a room, such as lighting fixtures, couches, windows, etc. For example, the dimensions of a window on a wall may be subtracted from the overall dimensions of the wall.

At 1130, a type and/or quantity of the of the architectural materials may be determined. The type and/or quantity of the architectural materials may be provided based on input provided by the user. For example, a user may indicate that they desire recessed lighting, oak flooring, brick façade, etc. The user may further indicate where they would like the architectural materials placed within the space. Based on this input, the materials modelling device may determine the quantity and/or cost of the architectural materials used, for example, based on the dimensions estimated in 1120. The quantity and/cost of the architectural materials may be determined based on the placement of the architectural materials, the type of the architectural materials used, as well as other factors. In addition to, or alternatively, the type and/or quantity of the architectural materials to be used may be determined (e.g., automatically determined) via materials modelling device. For example, the materials modelling device may predict placements of the architectural materials. In examples, the materials modelling device may predict placements of the architectural materials based on contemporary styles, geographic styles, styles of owners of different ages, etc. In examples machine learning rules may be used to determine potential types, quantities, locations, etc., of architectural materials.

At 1140, an image of the space may be displayed. The image of the space may be displayed in different phases of the predicted design and/or redesign. For example, an image of the space may be displayed prior to a potential design and/or redesign. One or more images of the space may be provided in which the proposed design/redesign is shown during the construction process and/or after the proposed design/redesign is complete. The user may be provided with capabilities to change one or more elements designed/redesigned in the room. For example, the user may use user device to change a proposed brick façade to drywall.

The image of the space may provide dimensions of the space. The dimensions may be based on different elements of the room. For example, the image may display the dimensions of the floor, ceiling, wall(s), etc. of the room.

The dimensions may exclude unrelated elements, such as couches, chairs, boxes, tables, etc. that are displayed in the image.

The image of the space may also contain data about the physical location of a space, time of day, date, etc. The data may be used to determine a category (e.g., size) of a renovation project. For example, based on the data it may be determined if a renovation project is a small project, a large project, etc. The category of the project may be provided to the user device. As described herein, the category of the project may be used by suppliers of architectural materials and/or service providers associated with the architectural material. For example, a particular supplier and/or service provider may be used based on the category of the project.

At 1150, the user device may display to the user the type and/or quantity of the architectural materials to be used in the proposed design/redesign. Additionally, or alternatively, the cost of the proposed architectural materials, the average time for completion of the design/redesign, etc., may be provided to the user.

An Appendix is provided at the end of the Drawings. The Appendix includes additional flow charts that further describe aspects of the concepts described herein. For example, the Appendix includes a Map and Factory Cut method, a Map and On-Side Cut method, a Map and Plan method, a Map and See method, and a Map and See and Hear method.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

We claim:

1. A computer-implemented method for designing a real-world space comprising:
    receiving image data for a user-generated image of a real-world space of the user, the real-world space comprising a surface that is modifiable via an architectural material;
    executing, for the image data, differentiating rules to differentiate elements of the image into coverable elements, non-coverable elements, and concealing elements, wherein the coverable elements include the surface that is modifiable via the architectural material;
    determining a pixel-to-length ratio of pixels within the image data for the image of the real-world space;
    executing measuring rules that use the pixel-to-length ratio to determine estimated real-world dimensions of the coverable elements and the concealing elements based on the received image data, the estimated real-world dimensions comprising at least two of a length, width, or height;
    calculating a quantity of the architectural material for covering the surface that is modifiable via the architectural material based on (a) the estimated real-world dimensions of the coverable elements, and (b) the estimated real-world dimensions of at least one of the concealing elements identified as being in front of at least one of the coverable elements; and
    displaying the calculated quantity of the architectural material and a modified version of the received image of the real-world space in which the surface is covered with the architectural material, wherein the modified version of the received image of the real-world space is based on the execution of the differentiating rules;
    wherein the executing, the calculating, and the determining are performed using one or more processors.

2. The computer-implemented method of claim 1, further comprising:
    receiving prior image data for images of other real-world spaces comprising other surfaces modifiable via architectural materials;
    estimating real-world dimensions of the other surfaces based on initial measurement rules;
    receiving real-world actual dimensions of the other surfaces; and
    generating the measuring rules for determining estimated real-world dimensions by modifying the initial measurement rules based on the estimated real-world dimensions of the surfaces and the actual real-world dimensions of the surfaces.

3. The computer-implemented method of claim 2, wherein the initial measuring rules are generated based on a relationship between the estimated real-world dimensions and the actual real-world dimensions of the surfaces.

4. The computer-implemented method of claim 1, wherein the estimated real-world dimensions are based on a reference object being placed in the space, the reference object having a known size and providing a spatial perspective to the image data for the image.

5. The computer-implemented method of claim 1, wherein the estimated real-world dimensions are based on a user's annotation of the real-world space; and
    wherein the user's annotation of the real-world space comprises the user differentiating two or more elements of the real-world space, and the two or more elements of the real-world space being comprised of a ceiling, wall, floor, fixture, window, door, furniture, or decoration within the space.

6. The computer-implemented method of claim 1, wherein the coverable elements comprise a representation of at least one of a ceiling, a wall, or a floor;
    the non-coverable elements comprise a representation of at least one of a window or a door; and
    the concealing elements comprise a representation of at least one of a piece of furniture or a decoration.

7. The computer-implemented method of claim 1, wherein the determinations of the estimated real-world dimensions are further based on an estimated reverberation time.

8. The computer-implemented method of claim 1, further comprising:
    determining a calculated cost of the quantity of the architectural material; and displaying the calculated cost.

9. The computer-implemented method of claim 1, wherein the modified version of the received image of the real-world space comprises the calculated quantity of the architectural material being presented upon the surface of the real-world space.

10. A system for designing a real-world space comprising:
    one or more processors configured to:
    receive image data for a user-generated image of a real-world space of the user, the real-world space comprising a surface that is modifiable via an architectural material;
    execute, for the image data, differentiating rules to differentiate elements of the image into coverable elements, non-coverable elements, and concealing elements, wherein the coverable elements include the surface that is modifiable via the architectural material;

determine a pixel-to-length ratio of pixels within the image data for the image of the real-world space;

execute measuring rules that use the pixel-to-length ratio to determine estimated real-world dimensions of the coverable elements and the concealing elements based on the received image data, the estimated real-world dimensions comprising at least two of a length, width, or height;

calculate a quantity of the architectural material for covering the surface that is modifiable via the architectural material based on (a) the estimated real-world dimensions of the coverable elements, and (b) the estimated real-world dimensions of at least one of the concealing elements identified as being in front of at least one of the coverable elements; and display the calculated quantity of the architectural material and a modified version of the received image of the real-world space in which the surface is covered with the architectural material, wherein the modified version of the received image of the real-world space is based on the execution of the differentiating rules.

11. A computer-implemented method for designing a real-world space comprising:

receiving image data for a user-generated image of a real-world space;

executing, with one or more processors, differentiating rules for the image data to differentiate elements of the image into coverable elements, non-coverable elements, and concealing elements;

determining a pixel-to-length ratio of pixels within the image data for the image of the real-world space;

executing measuring rules that use the pixel-to-length ratio to determine estimated real-world dimensions of at least one of the coverable elements and the concealing elements based on the received image data;

calculating a quantity of the architectural material for covering the surface that is modifiable via the architectural material based on (a) the estimated real-world dimensions of the coverable elements, and (b) the estimated real-world dimensions of at least one of the concealing elements identified as being in front of at least one of the coverable elements;

displaying, with the one or more processors, the calculated quantity of the architectural material; and displaying, with the one or more processors, a modified version of the received image of the real-world space in which the at least one of the coverable elements is covered with a selected architectural material based on the execution of the differentiating rules.

12. The computer-implemented method of claim 11, further comprising:

receiving prior image data for images of other real-world spaces comprising other surfaces modifiable via architectural materials;

estimating real-world dimensions of the other surfaces based on initial measurement rules;

receiving real-world actual dimensions of the other surfaces; and generating the measuring rules for determining estimated real-world dimensions by modifying the initial measurement rules based on the estimated real-world dimensions of the surfaces and the actual real-world dimensions of the surfaces; and wherein the initial measuring rules are generated based on a relationship between the estimated real-world dimensions and the actual real-world dimensions of the surfaces.

13. The computer-implemented method of claim 11, wherein the estimated real-world dimensions are based on a reference object being placed in the space, the reference object having a known size and providing a spatial perspective to the image data for the image.

14. The computer-implemented method of claim 11, wherein the elements of the image are further differentiated based on a user's annotation of the real-world space; and wherein the two or more elements of the real-world space being comprised of a ceiling, wall, floor, window, door, furniture, or decoration within the space.

15. The computer-implemented method of claim 11, wherein the architectural material is a flooring material.

16. The computer-implemented method of claim 11, wherein a type of the architectural material is based on a selected type selected by the user.

* * * * *